2,780,892

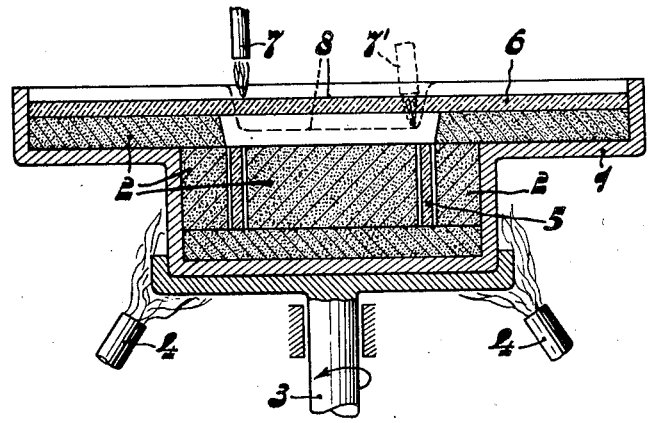
Fig. 1.
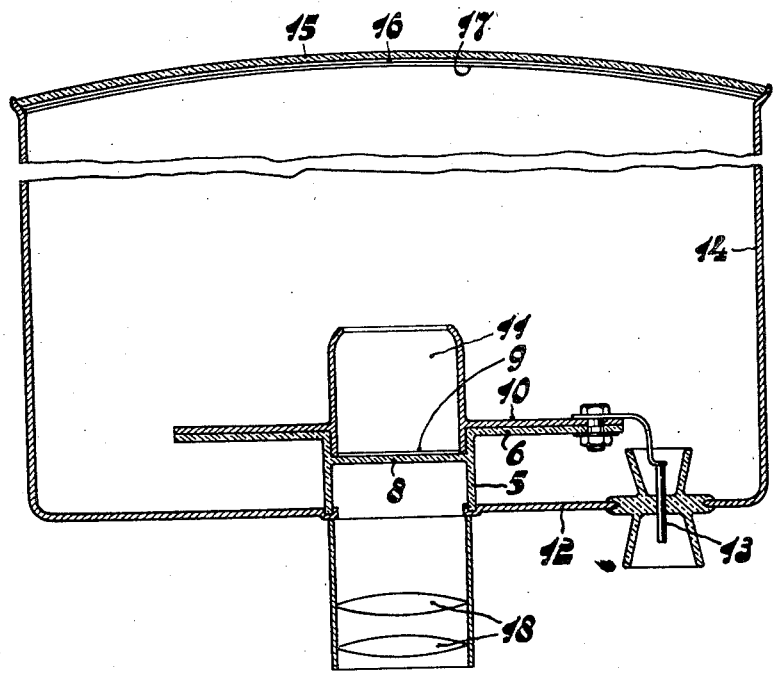
Fig. 2.
INVENTORS
OTTO LOUIS VAN STEENIS, Deceased
by Joris Daniels Heijligers, Executor
WILHELMUS ANTONIUS ROOVERS
BY 
AGENT United States Patent Office 2,780,892
Patented Feb. 12, 1957

METHOD OF MANUFACTURING OPTICAL WINDOWS AND OPTICAL WINDOW MANUFACTURED BY THIS METHOD

Wilhelmus Antonius Roovers, Eindhoven, Netherlands, and Otto Louis Van Steenis, deceased, late of Aalst-Waalre, Netherlands, by Joris Daniel Heijligers, executor, Eindhoven, Netherlands, assignors to Hartford National Bank and Trust Company, Hartford, Conn., as trustee Application March 17, 1954, Serial No. 416,914

Claims priority, application Netherlands March 18, 1953

3 Claims. (Cl. 49—81)

The invention relates to a method of manufacturing an optical window, more particularly for use in an electric discharge tube, for example an X-ray image intensifying tube.

In certain cases, for example, with an image-intensifying tube, it is required to provide an optical window which forms a closure of a hollow cylindrical body and is surrounded by a wide flange. The flange serves as a protector from breakdown on account of high voltages and has a width of the order of the diameter of the image window.

With such constructions a great difficulty arises in obtaining an image window which is completely faultless. It can therefore not be made of moulded glass. On the other hand it is a very circuitous operation to seal a window of plate glass separately in a cylindrical body and to provide this body with a sealed annular flange.

According to the invention the said disadvantages may be greatly reduced, if in a method of manufacturing an optical window which constitutes a closure of a hollow cylindrical body and is surrounded by a wide flange, the cylindrical body is arranged in a jig, a glass disc of the size of the flange being positioned at a certain distance over one end of the cylindrical body in the jig and preheated, after which the disc, in a narrow zone opposite the edge of the cylindrical body, is heated to such a temperature that the disc part inside this zone, constituting the window, sinks down on the edge of the cylindrical body, to which it seals itself, the window not becoming weak nor being deformed, nor being separated from the remainder of the disc constituting the flange.

If the manufacture starts with a disc of plate glass, the window will, consequently, be of plate glass and hence be completely flat and faultless. The cup-shaped recess produced in the disc above the window may be utilized with advantage to form a fluorescent layer on the window by settling. In general, the cylindrical body is also made of glass, but, as an alternative, it may be made wholly or in part of a metal readily sealable to glass.

It is known to manufacture windows from plate glass by clamping a glass disc tight at the edges, the part left free being caused to sink into a mould by heating. In this case, however, the window does not remain flat, the whole is made weak and the window curves in accordance with the hollow size of the mould. Moreover, such a window need not be sealed at a great distance from the flange edge to a cylindrical body.

In order that the invention may be readily carried into effect, it will now be described with reference to the accompanying drawing, in which Fig. 1 shows the jig for carrying out the method according to the invention and Fig. 2 shows one embodiment of a tube comprising an image window according to the invention.

Referring to Fig. 1, reference numeral 1 designates a metal envelope of a jig comprising graphite blocks 2, and seated on the shaft 3 so as to be rotatable and heated by burners 4.

Into the jig 2 is introduced a cylindrical body 5, in this case of glass, having an external diameter of, for example, 8 cms. and on the graphite blocks is put down a plate glass disc 6, having a diameter of about 24 cms. The disc 6 is arranged about 12 mms. over the upper edge of the cylinder 5.

After the assembly has been preheated to about 450° C., the disc 6 is strongly heated over a narrow zone at a distance of 4 cms. from the centre by sharp burners 7, i. e. opposite the edge of the cylinder 5, so that the disc 8 sinks down on the cylinder 5 and seals itself to the edge thereof. For this purpose the burners 7 may be lowered slightly, which is indicated by 7'. The disc 8 constitutes the window and the remaining part of the disc 6 constitutes the flange. The assembly may then be taken out of the jig and be cooled in a cooling furnace to remove strains.

To the window may be applied by settling a fluorescent screen 9 (Fig. 2), after which the construction may be incorporated in an image intensifying tube as shown in Fig. 2, subsequent to mounting of an electrode 10, comprising a space 11, on the flange 6. The bottom edge of the cylinder 5 is sealed or soldered, if necessary with the interposition of a ring of ferrochromium, to the bottom 12, made of glass or metal. In the bottom 12 provision is made of a through-connection conductor 13 to supply a high voltage (about 25 kv.) to the electrode 10. The flange 6 serves to avoid break-down from the electrode 10 to the bottom 12.

The tube comprises furthermore a bulb 14, sealed at the end remote from the screen 9 by a large window 15, which may be made of glass or, for example, aluminum and which is coated internally with a fluorescent layer 16, to which is applied a semi-transparent photocathode 17. The electron image emitted by the photocathode, when the layer 16 fluoresces, owing to the X-ray striking this layer, is focused by means (not shown) on the screen 9, the electrons being accelerated by the high potential at the electrode 10 and the space 11, so that a very intensified luminous image is produced on the screen 9. This image may be observed by means of lenses 18 in approximately the same size as the image on the screen 16. Instead of using the lenses 18, use may be made here of an image camera or a film camera.

Although a single embodiment is described above the method according to the invention may be carried out in a different way and in different fields. It is, for example, possible to perform the heating electrically, and insulators, for example, through-connection insulators for taking a current conductor through a wall and the like, may be manufactured by this method.

What is claimed is:

1. A method of manufacturing an optical window mounted on a hollow generally cylindrical body and surrounded by a wide flange, comprising the steps of providing a generally cylindrical body, placing a flat glass plate-like member substantially larger than said cylindrical body over but spaced from one end of the latter so that the plane of the flat glass member extends approximately at right angles to the axis of the cylindrical body, thereafter preheating the assembly, and thereafter heating a thin substantially annular intermediate portion of said flat glass member located approximately opposite to the edge of the cylindrical body at a temperature at which only the part of the glass member inside said annular portion sags downward without being deformed until it abuts the end of the cylindrical body and is sealed thereto, the remaining portions of said flat member then constituting the wide flange of the assembly.

2. A method of manufacturing an optical window mounted on a hollow cylindrical body of given diameter and surrounded by a wide flange having a diameter of the order of three times said given diameter, comprising the steps of providing a cylindrical body positioned with its axis in a vertical position, placing a flat disc-like plate glass member having a diameter about three times that of the cylindrical body over but spaced from one end of the latter so that the plate glass member extends in a horizontal plane, supporting all but a center portion of said plate glass member, thereafter preheating the assembly, thereafter heating a thin annular intermediate portion of said plate glass member surrounding the unsupported center portion and located opposite to the edge of the cylindrical body at a temperature at which the glass softens and only the unsupported center portion gravity sags downward to abut the cylindrical body without being deformed, and thereafter sealing together the abutting portions of the plate glass member and the cylindrical body.

3. A method as set forth in claim 2 wherein the cylindrical body is also glass.

References Cited in the file of this patent

UNITED STATES PATENTS

| | | |
|---|---|---|
| 2,215,644 | Hays | Sept. 24, 1940 |
| 2,389,360 | Guyer et al. | Nov. 20, 1945 |